US005122220A

United States Patent [19]

Seki

[11] Patent Number: 5,122,220

[45] Date of Patent: Jun. 16, 1992

[54] CORRUGATING MACHINE CAPABLE OF CONTROLLING PASTE PENETRATION

[75] Inventor: Yukuharu Seki, Hiroshima, Japan

[73] Assignee: Mitsubishi Jukogyo Kabushiki Kaisha, Tokyo, Japan

[21] Appl. No.: 470,461

[22] Filed: Jan. 26, 1990

[30] Foreign Application Priority Data

Jan. 26, 1989 [JP] Japan .................................. 1-15159

[51] Int. Cl.[5] .......................... B32B 31/12; B31F 1/20

[52] U.S. Cl. ................................... 156/470; 156/210; 156/547; 156/549; 118/242; 118/258

[58] Field of Search ............... 156/549, 547, 462, 470, 156/205, 210, 471, 472; 118/258, 242, 256, 259

[56] References Cited

U.S. PATENT DOCUMENTS

| | | | |
|---|---|---|---|
| 1,175,074 | 3/1916 | Neal | 156/549 X |
| 2,133,015 | 10/1938 | Boylan et al. | 118/DIG. 10 |
| 2,589,966 | 3/1952 | Rullo | 118/249 |
| 3,916,824 | 11/1975 | Knodel et al. | 118/262 X |
| 4,267,008 | 5/1981 | Owens | 156/547 X |

FOREIGN PATENT DOCUMENTS

| | | |
|---|---|---|
| 179395 | 9/1986 | European Pat. Off. . |
| 2095430 | 9/1982 | United Kingdom . |

*Primary Examiner*—Michael W. Ball
*Assistant Examiner*—Michele K. Yoder
*Attorney, Agent, or Firm*—Rothwell, Figg, Ernst & Kurz

[57] ABSTRACT

A mechanism for adjusting a distance between a glue machine and an introducing port of a heating port in a double facer corrugating machine is provided for the purpose of optimizing a penetrated amount of applied paste into a core paper sheet to insure a sticking force between a single-faced corrugated cardboard sheet and a liner. The distance adjusting mechanism includes guide rails and traveling wheels provided in the glue machine and running along the guide rails. In one aspect of the invention, the glue machine is adjustably moved along the guide rails by means of a hydraulic cylinder connected between the glue machine and a stationary frame, and in another aspect of the invention, the glue machine is adjustably driven along the guide rails by means of an electric motor mounted to the glue machine for driving the traveling wheels.

6 Claims, 4 Drawing Sheets

CORRUGATING MACHINE CAPABLE OF CONTROLLING PASTE PENETRATION

BACKGROUND OF THE INVENTION

1. Field of the Invention

The present invention relates to a corrugating machine, and more particularly to a corrugating machine provided with adjustable adhesion means.

2. Description of the Prior Art

At first, one example of a corrugating machine in the prior art will be described with reference to FIGS. 4 and 5. As shown in FIG. 4, paste (starch) d is applied to corrugated crest portions of a single-faced corrugated cardboard sheet a, b consisting of a liner c and a corrugated core paper sheet b which is manufactured by a single-facer in a preceding stage, by means of a paste feeder 13 in a glue machine 2 as shown in FIG. 5, and a liner c is preheated. The single-faced cardboard sheet a, b and the liner c are joined at an introducing port section of a double-facer 3, and in a heating part 3*a* forming a preceding stage of the double-facer 3 they are pinched between a plurality of heating boxes 20 and a canvas belt 19 adapted to be driven and also conveyed as pressed by a group of weight rollers 21. During passage through the heating part 3*a*, due to heating by the heating boxes 20 containing high-temperature steam therein, the paste d is solidified, hence the liner c is stuck to the single-faced corrugated cardboard sheet a, b and a double-faced cardboard sheet a, b, c is formed. This is cooled in a cooling part 3*b* in the succeeding stage and ejected from the side of a roller 18.

The paste d applied to the corrugated crest portions of the core paper sheet b and, in an ideal case, a predetermined amount d' of paste penetrates into the core paper sheet b as shown in FIG. 3, whereas in the case where an amount d'' of penetrated paste is too little as shown in FIG. 4(A), or in the case where an amount d'' of penetrated paste is too much as shown in FIG. 4(B), a strong adhesion force cannot be obtained.

In the above-described corrugating machine in the prior art, the distance between the glue machine 2 and the heating part 3*a* of the double facer 3 is constant and cannot be changed. In addition, depending upon whether the traveling speed of the single-faced corrugated cardboard sheet a, b is fast or slow, and depending upon the material and thickness of the core paper sheet and the permeability of the paste d caused by the state of the paste, the amount of penetration of paste into the core paper sheet can become excessive or insufficient, hence the degree of adhesion can vary widely, resulting in uneven distribution of strength of the double-faced corrugated cardboard sheet, and thereby the quality of the products can be greatly degraded. Furthermore, if the amount of penetration of paste becomes too much, it can cause the corrugated crest portions to be crushed.

As described above, in the corrugating machine in the prior art, since the glue machine for applying paste to the corrugated crest portions of the core paper sheet in a single-faced corrugated cardboard sheet and the heating part of the double facer for forming a double-faced corrugated cardboard sheet are fixedly installed with the distance between the glue machine and an introducing port of the heating part held constant, the amount of penetration of paste applied to the corrugated crest portions of the core paper sheet vary greatly depending upon various conditions such as the sheet traveling speed, the material and thickness of the core paper sheet, and the state of the paste, hence adhesion in the double facer becomes uneven, and thus degradation of quality was inevitable.

SUMMARY OF THE INVENTION:

The present invention resolves the above-mentioned problems in the prior art, and it is one object of the present invention to provide a novel corrugating machine, which is free from the above-mentioned disadvantages of the prior art, and which has improved adhesion performance and reliability.

According to one feature of the present invention, there is provided a corrugating machine including a glue machine for applying paste to corrugated crest portions of a single-faced corrugated cardboard sheet and a double facer for adhering a liner to the single-faced cardboard sheet after application of paste to produce a double-faced corrugated cardboard sheet, which further comprises distance adjusting means for adjusting the relative distance between the glue machine and an introducing port of a heating part in the double facer.

According to another feature of the present invention, there is provided the above-feature corrugated machine, in which the distance adjusting means consists of guide rails, traveling wheels provided in the glue machine and running along the guide rails, and a hydraulic cylinder connected to the glue machine.

According to still another feature of the present invention, there is provided the first-featured corrugated machine, in which the distance adjusting means consists of guide rails, traveling wheels provided in the glue machine and running along the guide rails, and a motor provided in the glue machine for driving the traveling wheels.

In other words, an essential feature of the present invention resides in the point that by adjusting the relative distance between the glue machine and an introducing port of the heating part in the double-facer, an amount of penetration of applied paste into a core paper sheet is effectively adjusted and thereby a constant adhesion force is insured.

According to the present invention, by virtue of the above-featured structure of the corrugating machine, the glue machine is adjustably moved relative to the introducing port of the heating part in the double-facer with the aid of the distance adjusting means, so that a relative distance therebetween can be adjustably changed, and hence an amount of penetration of applied paste into the core paper sheet can be effectively adjusted to a desired amount depending upon the sheet traveling speed, the thickness and material of the core paper sheet and the state of the paste, thus uneven distribution of adhesion can be eliminated, resulting in a strong adhesion force, and thereby the quality of the produced double-faced corrugated cardboard sheet can be enhanced.

The above-mentioned and other objects, features and advantages of the present invention will become more apparent by reference to the following description of preferred embodiments of the invention taken in conjunction with the accompanying drawings.

Figure 1:
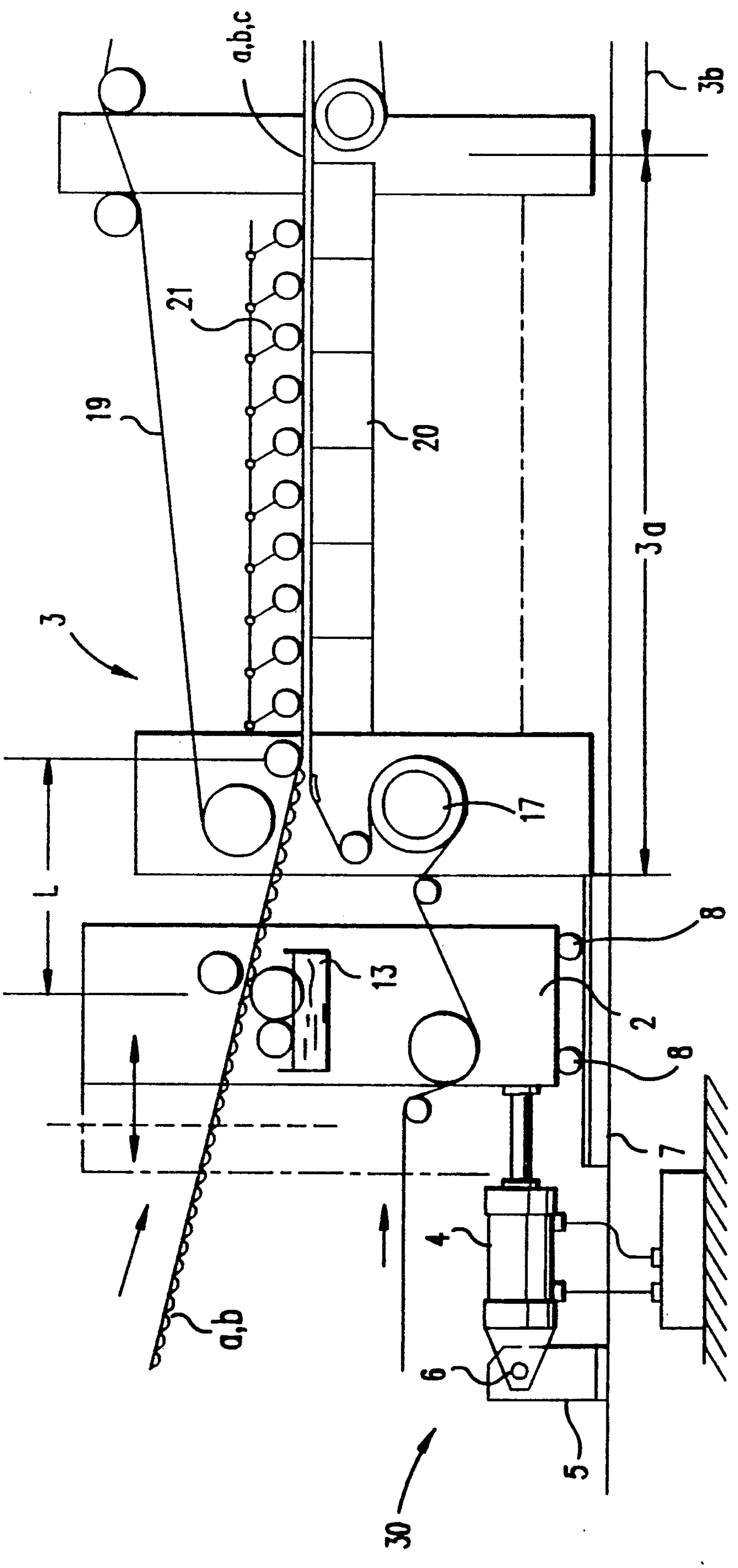
FIG. 1 is a schematic side view showing a first preferred embodiment of the present invention.

DESCRIPTION OF THE PREFERRED EMBODIMENTS:

Referring now to FIG. 1 which shows a first preferred embodiment of the present invention, reference numeral 2 designates a glue machine including a press roller, a pasting device 13 and the like, numeral 3 designates a double-facer including a canvas belt 19, a plurality of heating boxes 20, a group of press rollers 21 and the like and forming a heating part 3*a* and a cooling part 3*b*. In the illustrated embodiment, in a corrugating machine provided with the glue machine 2 for applying paste to corrugated crest portions of a single-faced corrugated cardboard sheet a, b, and a double-facer 3 for adhering a liner c to the single-faced corrugated cardboard sheet a, b after application of paste, there is provided a distance adjusting device 30 for adjusting a distance of the glue machine 2 relative to an introducing port of the heating part 3*a* in the double-facer 3.

The above-described distance adjusting device 30 has such structure that the glue machine 2 is provided with traveling wheels 8 and is disposed so as to travel back and forth as guided by guide rails 7, and a hydraulic cylinder 4 is pivotably secured to a bracket 5 via a pin 6 and is connected at the other end to the glue machine 2, and so, by controllably extending or contracting the hydraulic cylinder 4, the glue machine 2 can be moved towards or away from the introducing port of the heating part 3*a*, and the relative distance between the introducing port and the glue machine 2 can be adjusted.

Explaining now in more detail the first preferred embodiment of the present invention having the above-described construction, the single-faced corrugated cardboard sheet a, b produced by a single-facer (not shown) in the preceding stage is, after having paste d applied to the corrugated crest portions of the core paper sheet b by means of the pasting device 13 in the glue machine 2, introduced into the introducing port of the heating part 3*a* of the double facer 3, and at the same time a liner c is preliminarily heated by a preheater 17 and introduced to the introducing port of the heating part 3*a*, then the single-faced corrugated cardboard sheet a, b and the liner c are adhered together into a double-faced corrugated cardboard sheet a, b, c as being heated and conveyed, and the sheet is cooled in the cooling part 3*b*.

Figure 3:
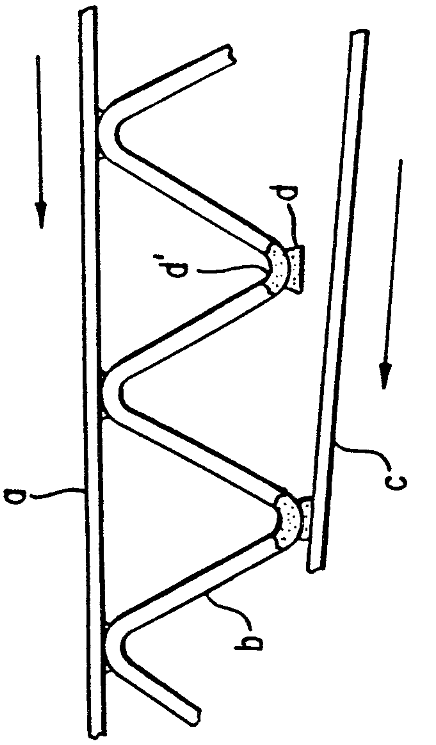
FIG. 3 is a vertical cross-section view of a corrugated cardboard sheet showing a good penetrated condition of paste.

Upon the above-mentioned adhering, it is necessary that the paste (starch) d applied to the corrugated crest portions of the core paper sheet b penetrates into the core paper sheet b to surely hold an appropriate amount of penetrated paste d' in the core paper sheet b, as shown in FIG. 3. Since the above-mentioned penetrated amount of paste would vary depending upon the traveling speed of the single-faced corrugated cardboard sheet a, b, the thickness and material of the core paper sheet b, and further upon the state of the paste d, a distance L between the glue machine 2 and the introducing port of the heating machine 3*a* is adjusted by making the glue machine 2 travel along rails 77 by controlling extension and contraction of the hydraulic cylinder 4, and thereby adjustment is made so as to realize a desired amount of penetrated paste d' as shown in FIG. 3.

In the above-mentioned adjustment, in the case where the traveling speed of the single-faced corrugated cardboard sheet a, b is fast, or in the case where permeability of the paste d is poor, the distance L is set long, whereas in the opposite case, the distance L is set short, thereby a traveling time of the sheet from the glue machine 2 up to the introducing port of the heating part 3*a* is varied, thus the amount of the penetrated paste d' upon adhesion can be adjusted, and even fine adjustment becomes possible. The adjustment can be achieved easily depending upon an operating condition, thereby an ideal penetrated condition of paste is always established, uneven distribution of adhesion is not present, a strong adhering force is attained, the shape of the core paper sheet is insured, and double-faced corrugated cardboard sheets a, b, c having high quality can be produced.

Figure 2:
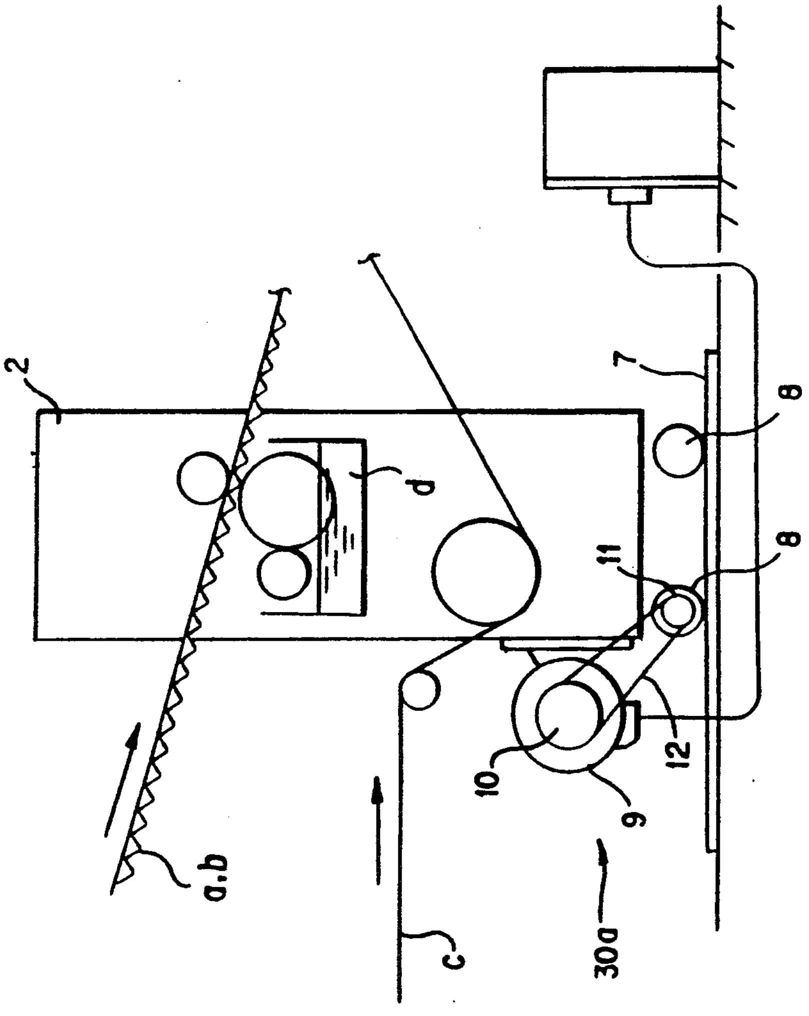
FIG. 2 is a schematic side view of an essential part showing a second preferred embodiment of the present invention.
Figure 4B:
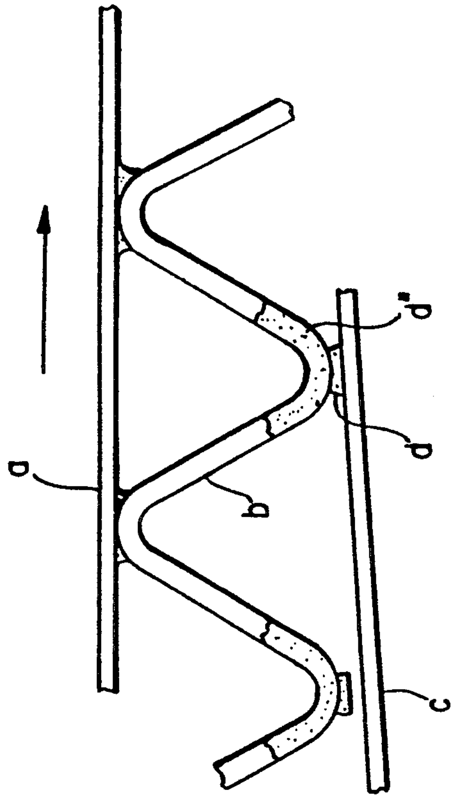
FIG. 4 B PRIOR ART
FIGS. 4(A) and 4(B) are vertical cross-section views of a corrugated cardboard sheet showing bad penetrated conditions of paste in the prior art.
Figure 4A:
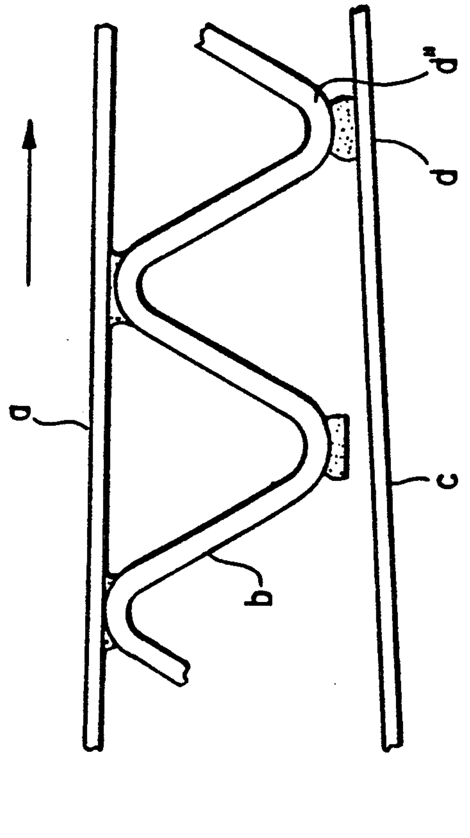
FIG. 4 A PRIOR ART
Figure 5:
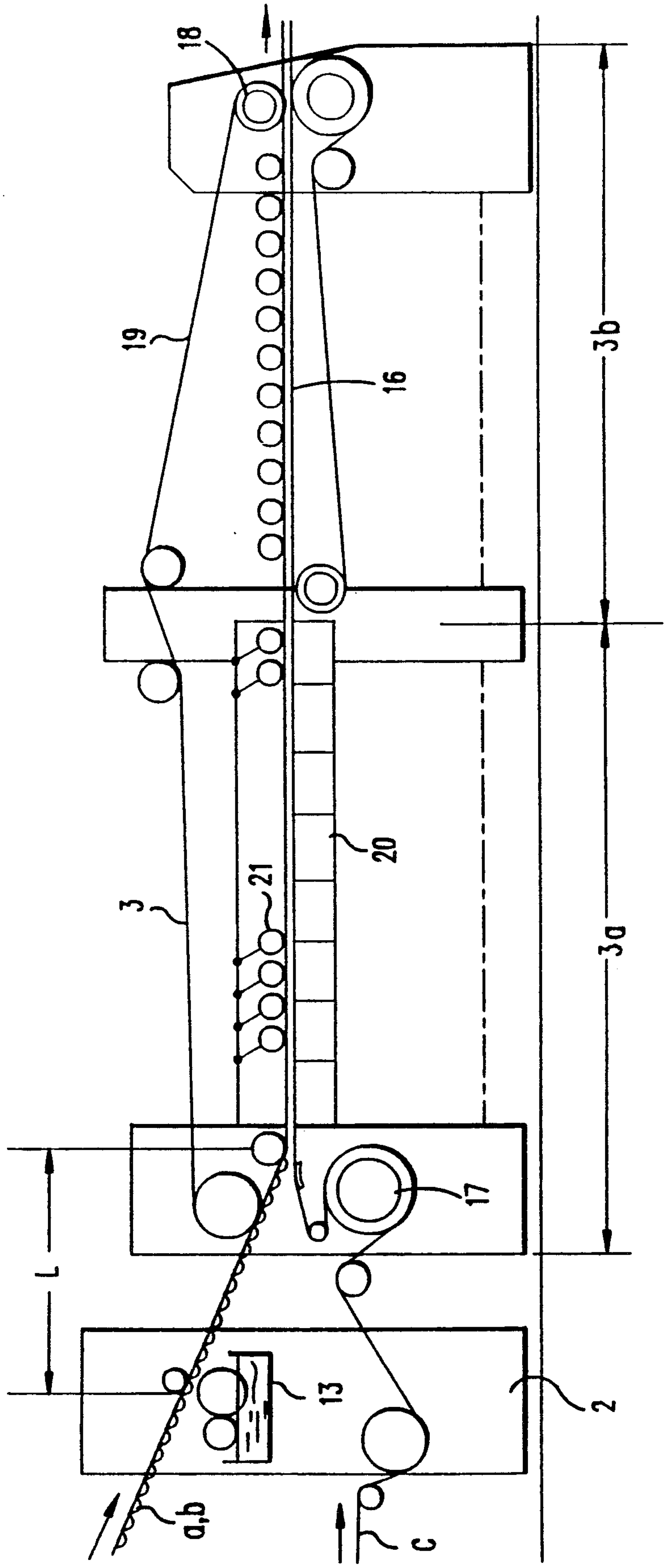
FIG.5 PRIOR ART
FIG. 5 is a schematic side view showing a corrugating machine of the prior art.

FIG. 2 shows a second preferred embodiment of the present invention. As compared to the first preferred embodiment, this second preferred embodiment has a structural feature in a distance adjusting device 30*a* constructed in such manner that a motor 9 is fixedly secured to a glue machine 2, traveling wheels 8 are rotationally driven by the motor 9 via a sprocket 10, a chain 12 and another sprocket 11 and thereby the distance L is adjusted. Basically, this distance adjusting device 30*a* achieves the same function and effect as the distance adjusting device 30*a* in the first preferred embodiment.

It is to be noted that the distance adjusting device should not be limited only to those disclosed in the above-described embodiments, but it can be constructed according to various mechanisms and systems, and many modifications can be made to the illustrated construction that are obvious to those skilled in the art.

The above-described embodiments are applicable to the manufacture of double-faced corrugated cardboard sheets or composite double-faced corrugated cardboard sheets.

As will be obvious from the detailed description above, according to the present invention, because of the above-described construction, the distance between the glue machine and the introducing port of the heating part in the double-facer can be easily changed and adjusted by the distance adjusting means, and this adjustment of the distance makes it possible to effectively adjust a penetrated amount of paste applied to the core paper sheet, hence uneven distribution of adhesion can be eliminated, a strong adhering force is attained, and double-faced corrugated cardboards having high quality are produced. Therefore, together with the adhering performance, a manufacturing performance of corrugated cardboard sheets and a reliability are greatly improved.

While a principle of the present invention has been described above in connection to preferred embodiments of the invention, it is intended that all matter contained in the description and illustrated in the accompanying drawings shall be interpreted to be illustrative and not in a limiting sense.

What is claimed is:

1. A corrugating machine, comprising:

a glue machine including a press roller for applying paste to corrugated crest portions of a single-faced corrugated sheet;

a double-facer for adhering a liner to said single-faced corrugated sheet after application of paste thereto to form a double-faced corrugated sheet; and distance adjusting means for adjusting the distance between said glue machine and a heating part of said double-facer so as to vary the amount of paste penetrating into said corrugated crest portions.

2. A corrugating machine according to claim 1, wherein said single-faced corrugated sheet passes through said glue machine at a certain sheet traveling speed, and said distance adjusting means for adjusting said distance to be longer for a relatively faster sheet traveling speed and shorter for a relatively slower sheet traveling speed.

3. A corrugating machine according to claim 2, wherein said distance adjusting means comprises:

at least one guide rail;

wheel means coupled to said glue machine for moving along said at least one guide rail; and a hydraulic cylinder connected to said glue machine for moving said glue machine on said wheel means relative to said heating part.

4. A corrugating machine according to claim 3, wherein said distance adjusting means comprises a pair of guide rails.

5. A corrugating machine according to claim 2, wherein said distance adjusting means comprises;

at least one guide rail;

wheel means coupled to said glue machine for moving along said at least one guide rail; and a motor coupled to said glue machine for driving said wheel means.

6. A corrugating machine according to claim 5, wherein said distance adjusting means comprises a pair of guide rails.

* * * * *

UNITED STATES PATENT AND TRADEMARK OFFICE
CERTIFICATE OF CORRECTION

PATENT NO. : 5,122,220

DATED : June 16, 1992

INVENTOR(S) : Yukuharu SEKI

It is certified that error appears in the above-identified patent and that said Letters Patent is hereby corrected as shown below:

TITLE PAGE:

In the Abstract, line 2, after "heating", delete "port", and insert --part--.

Column 1, line 13, after change "d" to --d--;

Column 1, line 15, change "a", "b", to --a--, --b--, and delete "c" and insert --a--;

Column 1, line 16, change "b" to --b--;

Column 1, line 19, change "c" and "a" to --c-- and --a--;

UNITED STATES PATENT AND TRADEMARK OFFICE
CERTIFICATE OF CORRECTION

PATENT NO. : 5,122,220

DATED : June 16, 1992

INVENTOR(S) : Yukuharu SEKI

It is certified that error appears in the above-identified patent and that said Letters Patent is hereby corrected as shown below:

Column 1, line 20, change "b" and "c" to --b-- and --c--;

Column 1, line 28, change "d" and "c" to --d-- and --c--;

Column 1, line 29, change "a" and "b" to --a-- and --b--;

Column 1, line 30, change "a", "b", and "c" to --a--, --b--, and --c--;

Column 1, line 33, change "d" to --d--;

Column 1, line 34, change "b" to --b--;

Column 1, line 35, change "d" to --d--;

Column 1, line 37, change "d" to --d--;

Column 1, line 46, change "a" and "b" to --a-- and --b--;

Column 1, line 48, change "d" to --d--;

Column 3, line 25, change "a" and "b" to --a-- and --b--;

Column 3, line 26, change "c" to --c--;

Column 3, line 27, change "a" and "b" to --a-- and --b--;

UNITED STATES PATENT AND TRADEMARK OFFICE
CERTIFICATE OF CORRECTION

PATENT NO. : 5,122,220
DATED : June 16, 1992
INVENTOR(S) : Yukuharu SEKI

It is certified that error appears in the above-identified patent and that said Letters Patent is hereby corrected as shown below:

Column 3, line 45, change "a" and "b" to --a-- and --b--;

Column 3, line 46, change "c" to --c--;

Column 3, line 48, change "b" to --b--;

Column 3, line 51, change "c" to --c--;

Column 3, line 54, "a", "b", and "c" to --a--, --b--, and --c--;

Column 3, line 55, "a", "b", and "c" to --a--, --b--, and --c--;

Column 3, line 59, change "d" to --d--;

Column 3, line 60, change "b" to --b--;

Column 3, line 61, change "b" to --b--;

Column 3, line 62, change "d′" and "b" to --d′-- and --b--;

Column 3, line 66, change "a" and "b" to --a-- and --b--;

Column 3, line 67, change "b" and "d" to --b-- and --d--;

Column 4, line 5, change "d′" to --d′--;

Column 4, line 9, change "a" and "b" to --a-- and --b--;

UNITED STATES PATENT AND TRADEMARK OFFICE
CERTIFICATE OF CORRECTION

PATENT NO. : 5,122,220

DATED : June 16, 1992

INVENTOR(S) : Yukuharu SEKI

It is certified that error appears in the above-identified patent and that said Letters Patent is hereby corrected as shown below:

Column 4, line 10, change "d" to --d--;

Column 4, line 15, change "d'" to --d'--;

Column 4, line 22, "a", "b", and "c" to --a--, --b--, and --c--;

Signed and Sealed this

Twenty-third Day of November, 1993

Attest:

BRUCE LEHMAN

*Attesting Officer* *Commissioner of Patents and Trademarks*